United States Patent Office 3,625,701
Patented Dec. 7, 1971

3,625,701
CARBOHYDRATE-GLUCONATE PRODUCTS
Raoul Guillaume Philippe Walon, Brussels, Belgium, assignor to CPC International Inc.
No Drawing. Filed Mar. 26, 1969, Ser. No. 810,783
Int. Cl. A23k 1/14
U.S. Cl. 99—2
2 Claims

ABSTRACT OF THE DISCLOSURE

Covers carbohydrate-gluconate products and food compositions thereof formed by selectively oxidizing the glucose in starch hydrolyzates or greens to form carbohydrate-gluconic acid and carbohydrate-gluconate mixtures. Also covers mode of formation of these compositions.

There has been an ever-continuing demand for new and inexpensive food products for both human and animal consumption. Improved and economical means for producing food products can go for towards solving this country's and the world's malnutrition problems. New and improved food products for human consumption can add needed variety to the human diet.

Starch is processed to provide a number of edible foods, one of the major of which is dextrose which is obtained by crystallization from starch hydrolyzates. The dextrose obtained in this manner is then used as a sweetening agent in many edible products. It would be economically desirable to use the starch hydrolyzate liquors per se, rather than to crystallize dextrose from them, since this would provide economies by avoiding the step of crystallizing out the dextrose. Economical food uses for greens, which are the starch hydrolyzate liquors remaining after at least one crop of dextrose has been crystallized out, would also be desirable.

When the term starch hydrolyzates is used hereafter what is meant is any glucose containing solution produced from a starch. For example, glucose crystallization liquors, greens, corn syrups, and the like.

The transportation and storage of starch hydroylzates is relatively expensive since they generally are not spray dryable, due to their high glucose content, and must be handled in the liquid state. This expense has to some extent limited the direct use of these materials in foods. It would be a distinct advantage if simple and economical treatment of starch hydrolyzates could lead to spray dryable products without the above-mentioned drawback. It would also be advantageous if the products contained high calcium or iron contents since calcium is a dietetic necessity for the formation of bones, teeth, shells, milk etc., in animals and iron is a dietetic necessary for the prevention of anemia.

It therefore becomes an object of this invention to provide a method of treating starch hydrolyzates, greens, and similar materials so that they can more directly be utilized in either animal feeds or human food.

Another object of the invention is to provide specific food products for both animal and human consumption.

Still another object of the invention is to provide a novel carbohydrate-gluconate product which can be spray dried for ease in handling, shipping, etc.

In accordance with the invention, I have discovered a process for prepring novel carbohydrate-gluconate products which comprises selectively oxidizing the glucose in a starch hydrolyzate solution to form a carbohydrate-gluconic acid product. A carbohydrate-gluconate product may be obtained by addition to the starch hydrolyzate solution of an amount of base stiochiometrically calculated to give the desired amount of metal gluconate in the final product through neutralization of the gluconic acid produced.

The base may be added before, during or after the oxidative step. The carbohydrate-gluconate product can be converted to a carbohydrate-gluconic acid product by conversion of the metal gluconate into gluconic acid.

The oxidation may be carried out enzymatically, by electrolysis, or by other chemical methods well known to the art. It is essential that the method of oxidation be chosen so that glucose is selectively oxidized to gluconate, without the concurrent oxidation of other saccharides.

Since the basic process involved here is a conversion of dextrose (glucose) to gluconate, a concomitant reduction in dextrose content occurs. In the starch art, it is customary to describe a change in the dextrose content of a material in terms of changes in the total reducing sugar content or dextrose equivalent of the material. The dextrose equivalent (D.E.) of a saccharide or mixture of saccharides and other materials is determined by titrating a solution of a weighed quantity of said saccharide or mixture with a mild oxidizer (Fehling's solution) in the presence of an oxidizable indicator such as ferrous cyanide until an end point is reached. From the amount of oxidizer used, it is possible to calculate the weight of pure dextrose with which said amount of oxidizer would react. This amount of dextrose is referred to as weight of reducing sugars in the sample expressed as dextrose. The dextrose equivalent is then defined as in the following equation:

$$\text{Dextrose equivalent} = 100 \times \frac{\text{weight of reducing sugars as dextrose}}{\text{weight of dry substance}}$$

DETAILED DESCRIPTION OF THE INVENTION

In the preferred procedure, the glucose in starch hydrolyzates is selectively oxidized enzymatically to a controlled extent by adding quantities of basic substances to hydrolyzate-enzyme mixtures and incubating the solutions. Potentially edible products are thereby obtained.

The amount of base added controls the degree of reaction in the enzymatic procedure because once this base has been used up in neutralizing any gluconic acid formed, the pH of the solution begins to drop and the enzyme is inactivated. This generally occrs at a pH of below about 4.5. The glucose oxidase enzyme will not operate to convert glucose to gluconic acid above a pH of about 8. Hence, during oxidation, the pH must be controlled to fall within the range from about 4.5 to about 8. Most preferably, the pH is maintained to fall within the range from about 5 to about 6.5 since the enzyme action is most efficient in this range.

One preferred procedure consists of using calcium carbonate as the base to control the extent of reaction of enzymatically oxidizing the glucose in greens. The greens are obtained from a dextrose crystallization process, and have a solids content adjusted by dilution if necessary falling within the range from about 10% to about 70% by weight. A product is recovered that is potentially usable as a poultry or cattle feed. In the most preferred procedure, components for feeds usable for poultry, cattle, etc., are produced from greens having a D.E. falling within the range from about 70 to about 80.

The product obtained from greens oxidized as described above preferably has a dextrose content falling within the range from about 25% to about 60%, a maltose content falling within the range from about 5% to about 25%, a calcium gluconate content falling within the range from about 5% to about 25%, and a higher saccharides content falling within the range from about 15% to about 30%, all percent figures being by weight based on total dry substance, and has a D.E. falling within the range from about 40 to about 80.

In another preferred embodiment, calcium carbonate is used as the base and the glucose in a starch hydrolyzate solution having a D.E. falling within the range from about 10 to about 70 is enzymatically oxidized to obtain a product which may be used as a baby food, a dietetic food, a clinical food, for poultry feeding, for cattle feeding, etc. A starch hydrolyzate with a D.E. falling within the range of from about 25 to about 40 is the preferred starting material for preparing these novel carbohydrate-gluconate products. The preferred product has a dextrose content falling within the range from about 0.1% to about 10%, a calcium gluconate content falling within the range from about 10% to about 60%, and a higher saccharides content falling within the range from about 50% to about 80%, all percent figures being by weight based on total dry substance, and has a dextrose equivalent falling within the range from about 1 to about 25. More preferably, an amount of calcium carbonate is added sufficient to reduce the D.E. through enzymatic formation of calcium gluconate to a value of no more than 5. Most preferably, the calcium gluconate content in the final product is about 30% by weight.

The calcium gluconate containing product may be converted into an iron gluconate product by passing a solution containing up to about 40% calcium gluconate through a cation exchange column containing ferrous iron wherein the ferrous ions will leave the column to form ferrous gluconate and the calcium ions will replace the ferrous ions on the cation exchange column. The ferrous gluconate product is useful as a foam stabilizer in beers and it may also be added to animal feeds to improve the red color and nutritional value of meat.

In each of the above examples, a powdered product may be obtained by spray drying the reaction product which can then be easily packaged and distributed. The powder may also be compressed into solid cakes for use as a building material.

In a further preferred embodiment, a carbohydrate-gluconic acid product usable as a soft drink syrup is prepared by starting with a starch hydrolyzate with a D.E. of above about 85. Sufficient sodium hydroxide is added progressively to the starch hydrolyzate while maintaining the pH to fall within the range from about 4.5 to about 8, during enzymolysis to give a gluconic acid content in the product after conversion of the sodium gluconate to gluconic acid, falling within the range from about 5% to about 25% by weight of total dry substance. Preferably, the pH is controlled so as to fall within the range from about 5 to about 6.5 during the sodium hydroxide addition. The preferred product has a levulose content falling within the range from about 10% to about 50%, and a dextrose content falling within the range from about 35% to about 70%, all percent figures being by weight based on dry substance. Most preferably, the gluconic acid content of the product is about 15% by weight.

The sodium gluconate is converted to gluconic acid by passing the product obtained as described above through a cation exchange column which has been saturated with hydrogen ions wherein the sodium ions leave the solution and are absorbed on the column and the hydrogen ions leave the column and enter the solution. Alternatively, the sodium ions may be replaced by hydrogen ions, by electrodialysis, or other chemical techniques.

The treated hydrolyzate may be concentrated for use as a soft drink syrup by removal of water by evaporation, distillation, freezing or other method or used, for this and other purposes, without concentrating. Additional sweetening agents, flavors, preservatives, etc. may be added to the hydrolyzate or concentrated syrup to adjust flavor and improve storability. The additional sweetening agents are preferably sweet dextrose solids, for example a mixture with a levulose content falling within the range from about 24% to about 29%, a dextrose content falling within the range from about 1% to about 3%, and the remainder higher saccharides, all percent figures being by weight based on dry substance. The additional sweetening agents, flavors and preservatives may alternatively be mixed with a soft drink made from the hydrolyzate or concentrated syrup.

Preferably, the gluconic acid content of the soft drink should fall in the range from about 0.8% to about 0.16% by weight. Most preferably, the soft drink is carbonated by pressurization and equilibration with carbon dioxide gas. The tart flavor of the soft drink is due to the gluconic acid content. Taste tests of the soft drink formulated in this manner and which contained orange and lemon flavoring materials have been very encouraging.

The following examples illustrate processes for preparing the novel carbohydrate gluconate products of this invention. All percentage figures are weight percent based on dry substance unless otherwise defined.

Example 1.—Preparation of calcium gluconate product from greens

This example demonstrates the preparation of high calcium product suitable for use as a constituent of a poultry feed, a cattle feed, etc., or which may be packed together to form building blocks, etc.

Greens, obtained from a dextrose crystallization process and consisting of 57% dextrose, 15% maltose-isomaltose and 27% higher saccharides (1% analytical uncertainty) with a composite D.E. of 76, were diluted to a 40% (40 grams per 100 ml.) solution with water. The glucose oxidase enzyme Ovazyme, obtained from Fermco Laboratories, Chicago, Ill., was added in a concentration of 0.01%. Sufficient calcium carbonate was added to the mixture to produce 15% calcium gluconate in the final product, the entire reaction mass was constantly agitated, in a sealed vessel at 35° C., and oxygen gas was supplied to maintain the reaction vessel at about 1 p.s.i.g. positive pressure. The reaction ceased when sufficient calcium carbonate had been transformed, through neutralizing the gluconic acid formed, into calcium gluconate so that the pH of the solution had dropped far enough to stop enzyme action. The analysis of the resulting syrup showed 42% dextrose, 15% maltose-isomaltose, 15% gluconate, and 27% higher saccharides (1% analytical uncertainty). The syrup had a D.E. of 61. The product was easily spray dried.

Example 2.—Preparation of gluconic acid product from high D.S. starch hydrolyzate A starch hydrolyzate was coverted to a dextrose-levulose solution which exhibited a D.E. of 96.8, the solids therein consisting of 66.4% dextrose, and 27.5% levulose and the remainder higher saccharides, by standard techniques well known in the art. The solution was placed in a closed reaction vessel with glucose oxidase enzyme. Sufficient sodium hydroxide was added dropwise to the reaction vessel during the course of the reaction to transform 15% of the dextrose into sodium gluconate, based on total sodium hydroxide added. The pH was maintained in the range of 5 to 6.5 during NaOH addition. Oxygen was added to the reaction vessel and a positive pressure of about 1 p.s.i.g. was maintained. When all of the sodium hydroxide had been consumed, the reaction ceased due to inactivation of the enzyme as the pH dropped. The resulting solution was treated by electrodialysis to convert the sodium gulconate into gluconic acid. An acid sweet syrup was obtained having a composition of the solids therein of 51% dextrose, 27.5% levulose, 15% gluconic acid, and the remainder higher saccharides. The sweetening power of this syrup was 90% of that of sucrose.

This example demonstrates the preparation of an acid sweet syrup, the acidity of which is due to the presence of gluonic acid.

Example 3.—Preparation of calcium gluconate product from starch hydrolyzate

An alpha amylase treated hydrolyzate consisting of 32% dextrose and 68% saccharides which exhibited a D.E. of 45, was put in a closed reaction vessel with glucose oxidase enzyme and with sufficient calcium carbonate to convert 30% of the 32% of the dextrose into calcium gluconate. The reaction was allowed to continue for seven hours. The product obtained showed an analysis of 2% dextrose, 30% calcium gluconate and 68% higher saccharides. It exhibited at D.E. of 13.

The production of high calcium products potentially usable as baby foods, dietetic foods, clinical foods, poultry feed, cattle feeds, baking additives, etc., is described in this example.

Example 4.—Preparation and testing of lemon flavored soft drinks

A sweet syrup solution was prepared consisting of dextrose—67%, levulose—26%, maltose—1.2%, maltotriose—1.3% and higher saccharides—1.2%, (weight percent of total solids, remainder uncertain due to analytical error). It had a dextrose equivalent of 95 and a pH of 4.5. Six blends were then made up using the gluconic acid containing syrup of Example 2 and the above sweet syrup in different proportions. A seventh blend was made up to contain 0.17% citric acid and 11% sucrose (percent figures based on total weight of solution). Carbonated water was added to each of the blends which was then sealed in a hermetically closed bottle and homogenized by shaking. The compositions of the soda water resulting from diluting each of the seven blended syrups is given in Table 1. A test panel of eight (8) persons tested each of the seven formulations. Preferences of the members of the panel varied but the majority preferred compositions 5 and 6. All test panel members considered the compositions palatable.

TABLE 1

| Component | Calculated formulation, weight percent of solution | | | | | | |
|---|---|---|---|---|---|---|---|
| | 1 | 2 | 3 | 4 | 5 | 6 | 7 |
| Citric acid | | | | | | | .17 |
| Gluconic acid | .16 | .32 | .32 | .53 | .8 | .8 | |
| Corn syrup solids | 6.9 | 5.5 | 10.9 | 6.3 | 7.4 | 13 | |
| Dextrose | 4.6 | 3.6 | 7.3 | 4.1 | 4.8 | 8.6 | |
| Levulose | 1.8 | 1.5 | 2.9 | 1.8 | 2.1 | 3.6 | |
| Maltose and higher dextrose polymers | .5 | .4 | .7 | .4 | .5 | .8 | |
| Sucrose | | | | 4.5 | 4.5 | | 11 |
| Lemon flavor | .15 | .15 | .15 | .15 | .15 | .15 | .15 |
| Total sugars | 11 | 12.4 | 11 | 10.9 | 10.8 | 11.9 | 13 |
| pH (measured) | 2.4 | 2.65 | 2.5 | 2.5 | 2.3 | 2.3 | 2.3 |

The testing of lemon flavored soft drink products prepared by the methods of this invention is described above. The data indicate that the tested compositions exhibit a pleasing flavor.

Example 5.—Preparation and testing of orange flavored soft drinks

A gluconic acid-containing syrup conissting of 11.5% gluconic acid, 57.2% dextrose, 23.4% levulose and 7.9% of higher saccharides of a degree of polymerization of 2 or higher was prepared by the method of Example 2. The syrup exhibited a dextrose equivalent of 83.5. Blends of this gluconic acid-containing syrup and the sweet syrup of Example 4 were made. The blends were then mixed with carbonated water and flavor, and the resulting soft drinks were tested by a 10 person panel. Equal quantities of orange extract were added to each soft drink. Soft drinks were made containing the following composition (weight percent of solution):

(1)
| | Percent |
|---|---|
| Gluconic acid | .35 |
| Sweet dextrose solids | 12 |

(2)
| | |
|---|---|
| Gluconic acid | .50 |
| Sweet dextrose solids | 12 |

(3)
| | |
|---|---|
| Gluconic acid | .70 |
| Sweet dextrose solids | 12 |

(4)
| | |
|---|---|
| Citric acid | 0.1 |
| Sucrose | 11 |

0.2% orange extract was added to each soft drink. All panelists agree that composition 2 exhibited the most pleasing acidity.

This example demonstrates that pleasant tasting orange flavored soft drinks may also be made by the methods revealed in this disclosure.

Example 6.—Preparation and testing of orange flavored soft drinks to determine suitable sugar levels A series of seven soft drinks were prepared all containing .50% based on the weight of solution of gluconic acid. The ratio of sweet dextrose solids from a sweet syrup produced as in Example 4 to sucrose and the total sugar content were varied in the seven soft drinks as shown in Table 2. The sweet dextrose solids consisted of 26% levulose, 67% dextrose, 1.2% maltose, and the remainder higher saccharides. The resulting soft drinks Table (2) were tasted by a test panel of 10 persons. Six of the panelists preferred formulation 5. One preferred formulation 4. One preferred formulation 1 and two preferred formulation 7. The stability of formulation 5 was tested for 2 months at 5° C. and 25° C. and was found to be good.

TABLE 2

| Trial: | Weight ratio sweet dextrose solids/sucrose | Total sugar content, weight percent of solution |
|---|---|---|
| 1 | 50/50 | 11 |
| 2 | 60/40 | 11 |
| 3 | 70/30 | 11 |
| 4 | 80/20 | 11 |
| 5 | 100/0 | 11 |
| 6 | 100/0 | 12 |
| 7 | 0/100 | 11 |

This example demonstrates that the use of sweet dextrose solids instead of sucrose in orange flavored soft drink compositions imparts improved flavor.

Example 7.—Preparation and testing of lemon flavored soft drinks to determine suitable sugar levels Four soft drink compositions were formulated and submitted to a taste test panel. All contained .15% based on solution weight of lemon extract. The formulations were (weight percent of solution):

(1)
| | Percent |
|---|---|
| Gluconic acid | 0.7 |
| Sweet dextrose solids | 11 |

(2)
| | |
|---|---|
| Gluconic acid | 0.7 |
| Sweet dextrose solids | 12 |

(3)
| | |
|---|---|
| Gluconic acid | 0.7 |
| Sweet dextrose solids | 13 |

(4)
| | |
|---|---|
| Citric acid | 0.2 |
| Sucrose | |

The majority of the panel preferred composition 1.

The preference of a test panel for a lemon flavored soft drink composition containing 0.7% gluconic acid and 11% sweet dextrose solids as compared to a composition containing 0.2% citric acid and 11% sucrose, has been revealed in this example.

The product of Example 1, prepared from greens, showed a significant advantage over the starting material in that it could be easily spray dried. It may be used as a poultry or cattle feed additive or may be packed and shaped into blocks and used as a building material.

The product from Example 2 consists of a syrup useable in soft drinks.

The product of Example 3, made from a starch hydrolysate with a D.E. of 45, due to its relatively low glucose content, is easy to handle in a spray drying tower. This product should be useful as an additive in poultry feeds, cattle feeds, in milk replacement substitutes, as a constituent of dietetic foods, baby foods, desserts, etc.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A solid free-flowing powered product containing an amount of dextrose falling within the range from about 25% to about 60%, an amount of maltose falling within the range from about 5% to about 25%, an amount of calcium gluconate falling within the range from about 5% to about 25%, and an amount of higher saccharides falling within the range from about 15% to about 30%, and having a dextrose equivalent falling within the range from about 40 to about 80, all percentage figures being by weight.

2. A solid free-flowing powdered product containing an amount of dextrose falling within the range from about 0.1% to about 10%, an amount of calcium gluconate falling within the range from about 10% to about 60% and an amount of higher saccharides falling within the range of from about 50% to about 80%, and having a dextrose equivalent falling within the range from about 1 to about 25, all percentage figures being by weight.

References Cited
UNITED STATES PATENTS

| | | | |
|---|---|---|---|
| 1,609,064 | 11/1926 | Corbett | 99—2 |
| 1,767,178 | 6/1930 | Herrick et al. | 99—4 |
| 2,087,076 | 7/1937 | Wadsworth et al. | 99—142 |
| 2,567,060 | 9/1951 | Docal | 127—41 X |
| 3,305,395 | 2/1967 | Scallet et al. | 127—40 X |

NORMAN YUDKOFF, Primary Examiner

K. VAN WYCK, Assistant Examiner

U.S. Cl. X.R.

99—28, 63, 86, 139, 142; 127—29